2,867,628

HYDROGENATION OF COMPOUNDS ABSORBED ON THE CATALYTIC SUPPORT

Oliver W. Cass, Lewiston, N. Y., assignor to E. I. du Pont de Nemours and Company, Wilmington, Del., a corporation of Delaware No Drawing. Application April 6, 1954
Serial No. 421,429

7 Claims. (Cl. 260—346.8)

This invention relates to the catalytic reduction of organic compounds. More particularly, it relates to the hydrogenation of compounds structurally capable of being hydrogenated while the compounds are held on an adsorbent serving as the support for a suitable hydrogenation catalyst.

During the course of organic syntheses, two or more operations must sometimes be performed on the same chemical. Thus, a particular unsaturated compound is frequently separated from admixture with diluents in one step and then converted to a saturated compound in a second step. A combination of physical and chemical operations may be utilized in such processes including, for example, the adsorption of the unsaturated compound on a porous adsorbent, a subsequent desorption by heating the adsorbent in a stream of an inert gas sweeping therethrough and a final reduction of the unsaturated material to the corresponding saturated compound by hydrogenation over an appropriate catalyst. The separate steps in such a process may usually be carried out without great difficulty but taken together are rather cumbersome. A major object of this invention is, therefore, to simplify the process of selective adsorption and reduction described. A more specific object of the invention is to develop a process in which the desorption and the reduction of an unsaturated compound may be carried out simultaneously.

The above-mentioned and additional objects of the invention may be accomplished by a process in which a compound containing a chemical group capable of being hydrogenated is first selectively adsorbed from a stream of mixed gases on an adsorbent medium carrying deposited thereon a hydrogenation catalyst and, after the flow of mixed gases is interrupted, is then desorbed in a reducing stream of hydrogen gas.

Chemical groups capable of being hydrogenated include in general the unsaturated groups common in organic chemistry. Usually they contain carbon to carbon double and triple bonds or similar carbon to nitrogen or nitrogen to nitrogen linkages. Oxygen or sulfur containing compounds may, however, also be subject to hydrogenation. Suitable specific compounds include diols such as butynediol and butanediol, ring compounds such as furan, cyanides or nitriles such as propionitrile, benzonitrile, adiponitrile and benzyl cyanide, nitro compounds such as nitrobenzene, oxygen containing compounds such as acetophenone and phthalic anhydride and compounds containing more than one group capable of hydrogenation such as maleic anhydride and furfural. Numerous other illustrative compounds will readily occur to those skilled in organic chemistry.

The adsorbent medium may consist of any of the usual porous adsorbents. Alumina, silica and charcoal are perhaps the most common. It is primarily essential that the adsorbent chosen should be able to serve as a carrier for a hydrogenation catalyst without major loss of its adsorptive powers.

The catalyst carried by the adsorbent may be any of the hydrogenation catalysts known to the art. Suitable catalysts include nickel, cobalt or the platinum metals ruthenium, rhodium, palladium, osmium, iridium and platinum itself.

Only small amounts of the catalyst need be deposited on the carrier. In general, the catalytic metal employed should comprise about 1–5% of the total supported catalyst. Much larger proportions of the catalyst might interfere with the adsorbent functions of the carrier.

The preparation of a supported catalyst as employed in this invention is well known to the art. The catalytic metal is merely evenly deposited in a finely divided state on a porous inert carrier of the type described. Palladium, for example, may be deposited on an activated charcoal by reducing a small quantity of the metal from an aqueous solution of one of its salts in the presence of the requisite amount of charcoal.

The temperature and pressure conditions utilized in the instant process are not particularly critical. The compound to be hydrogenated may be volatilized at atmospheric pressure and adsorbed on the porous carrier. The temperature of the adsorbed material may then be allowed to fall to that of the room before proceeding or reduction may be carried out immediately by passing hydrogen at ambient temperature and pressure through the adsorbed material. Heat will be generated by the hydrogenation in any case and aid in the desorption. If complete desorption is desired during the hydrogenation, application of external heat may be found advantageous. Superatmospheric pressure can, of course, be utilized during the hydrogenation but requires special equipment and hence is not preferred.

There follow some examples which illustrate in more detail various aspects of the invention.

Example 1

This example illustrates the adsorption and reduction of benzonitrile by the methods of this invention.

Five grams of benzonitrile were vaporized in a slow stream of nitrogen and passed through 20 grams of a porous adsorbent carrying a hydrogenation catalyst. The adsorbent catalyst employed consisted of 0.5% palladium deposited on 40–80 mesh alumina of the type known commercially as H–41. The entire five grams of the benzonitrile were adsorbed. Hydrogen was then passed over the catalyst at the rate of 400 ml./min. The hydrogen and the catalyst were initially at ambient temperature. Considerable heat was, however, evolved when the hydrogenation began. The product volatilizing from the catalyst was collected in cold traps and identified as toluene. The yield of toluene found in the traps was 83%.

Example 2

This example illustrates the adsorption and reduction of nitrobenzene to aniline.

Five grams of nitrobenzene were volatilized and passed over a fresh catalyst of the type used in Example 1. Hydrogen at room temperature was passed through the adsorbent and the products collected in cold traps. The yield of aniline found in the traps was 40%.

Example 3

This is another example illustrating the reduction of nitrobenzene.

The run of Example 2 was substantially repeated except that the supported catalyst employed consisted of 10 grams of palladium on "Nuchar." The absorptive support "Nuchar" is a well-known commercial activated charcoal. Aniline was formed when hydrogen was passed through the catalyst as in the previous example.

Example 4

This example illustrates the adsorption and reduction of maleic anhydride.

Five grams of volatilized maleic anhydride were passed over the supported palladium on alumina catalyst as shown in Examples 1 and 2. Hydrogen was then passed through the catalyst at an initial temperature of 100° C. to give a 20% yield of a mixture of reaction products consisting primarily of butyric acid and butyrolactone.

It should be noted, with respect to each of the four examples given, that no attempt was made to determine the amount of reduced material left on the adsorbent. Reduction was probably complete in all instances.

Having described my invention, I claim:

1. In the catalytic hydrogenation of an unsaturated organic compound capable of being hydrogenated, the improvement which comprises (1) passing a gaseous mixture containing said organic compound into contact with a porous adsorbent for said compound and thereby adsorbing the compound from the gaseous mixture, said adsorbent serving as the support for a finely-divided metallic catalyst for hydrogenating the compound, (2) interrupting the passage of the mixture into contact with the adsorbent, and (3) subsequently hydrogenating the organic compound while it is held on the adsorbent.

2. The process of claim 1 in which the hydrogenation catalyst is a member of the group consisting of platinum, palladium, cobalt and nickel.

3. The process of claim 2 in which the porous adsorbent is a member of the group consisting of alumina, silica and activated carbon.

4. In the catalytic hydrogenation of benzonitrile, the improvement which comprises (1) passing a mixture of gases containing benzonitrile into contact with a porous adsorbent for benzonitrile serving as a support for a finely-divided metallic hydrogenation catalyst, and thereby adsorbing benzonitrile from said mixture, (2) stopping the passing of the mixture into contact with the porous adsorbent and (3) subsequently hydrogenating the benzonitrile while it is held adsorbed on the porous adsorbent.

5. In the catalytic hydrogenation of nitrobenzene, the improvement which comprises (1) passing a mixture of gases containing nitrobenzene into contact with a porous adsorbent for nitrobenzene serving as a support for a finely-divided metallic hydrogenation catalyst, and thereby adsorbing nitrobenzene from said mixture, (2) stopping the passing of the mixture into contact with the porous adsorbent and (3) subsequently hydrogenating the nitrobenzene while it is held adsorbed on the porous adsorbent.

6. In the catalytic hydrogenation of maleic anhydride, the improvement which comprises (1) passing a mixture of gases containing volatilized maleic anhydride into contact with a porous adsorbent for maleic anhydride serving as a support for a finely-divided metallic hydrogenation catalyst and thereby adsorbing maleic anhydride from said mixture, (2) stopping the passing of the mixture into contact with the porous adsorbent and (3) subsequently hydrogenating the maleic anhydride while it is held adsorbed on the porous adsorbent.

7. The process of claim 6 in which the adsorbent is alumina and the hydrogenation catalyst is finely-divided palladium.

References Cited in the file of this patent

UNITED STATES PATENTS

| Number | Name | Date |
| --- | --- | --- |
| 1,081,182 | Wimmer | Dec. 9, 1913 |
| 1,436,662 | Lessing | Nov. 28, 1922 |
| 1,530,392 | Morrell | Mar. 17, 1925 |
| 2,072,861 | Amend et al. | Mar. 9, 1937 |
| 2,130,501 | Lazier | Sept. 20, 1938 |
| 2,131,734 | Henke | Oct. 4, 1938 |
| 2,165,515 | Schmidt | July 11, 1939 |
| 2,449,036 | Grunfeld | Sept. 7, 1948 |
| 2,458,214 | Souders | Jan. 4, 1949 |
| 2,560,555 | Condit | July 17, 1951 |

OTHER REFERENCES

Ellis: "Hydrogenation of Org. Substances," 3rd ed.; (1) page 11, Sec. 215; (2) pages 64–64, Sec. 656 and 656A; (3) pages 108–9, Sec. 946; (4) page 266, Sec. 2552; and page 272, Sec. 2611; Van Nostrand (1930).

Sabatier: "Catalysis in Org. Chem.," page 40, Sec. 138, and page 41, Sec. 141, Van Nostrand (1922).

Keier: Chem. Abst., vol. 46, pages 10820–10821 (1952), citing Izvest. Akad. Nauk S. S. S. R., Otdel Khim. Nauk, 1952, pages 616–626.

Keier: Chem. Abst., vol. 47, pages 5780–5781 (1953), Izvest. Akad. Nauk S. S. S. R., Otdel Khim. Nauk, 1953, pages 48–57.

Adkins et al: J. A. C. S., 70, pages 695–8 (1948).

Laidler: J. Phys. and Colloid Chem., 55, pages 1067–78 (1951).